United States Patent [19]

Petitjean et al.

[11] Patent Number: 4,546,356

[45] Date of Patent: Oct. 8, 1985

[54] PROCESS FOR THE PROTECTION OF A RADAR AGAINST JAMMING AND RADAR FOR PUTTING THIS PROCESS INTO EFFECT

[75] Inventors: Christian Petitjean; Guy L. Parquier, both of Boulogne-Billancourt, France

[73] Assignee: LMT-Radio Professionnelle, Boulogne-Billancourt, France

[21] Appl. No.: 408,412

[22] Filed: Aug. 16, 1982

[30] Foreign Application Priority Data

Aug. 21, 1981 [FR] France .................................. 81 16118

[51] Int. Cl.⁴ ............................................... G01S 7/36
[52] U.S. Cl. .................................................... 343/18 E
[58] Field of Search ...................................... 343/18 E

[56] References Cited

U.S. PATENT DOCUMENTS

| | | | |
|---|---|---|---|
| 3,191,173 | 6/1965 | Farner | 343/17.1 R |
| 3,981,013 | 9/1976 | Christensen | 343/18 E X |
| 4,130,821 | 12/1978 | Goldie | 343/17.1 R |
| 4,143,375 | 3/1979 | Knopf | 343/18 E |
| 4,435,710 | 3/1984 | Powell | 343/18 E |

Primary Examiner—T. H. Tubbesing

[57] ABSTRACT

A process for protecting radars against jamming, in which a pseudo signal is transmitted simultaneously with the useful signal and is formed from pulses synchronous with those of the useful signal. The amplitude of the pseudo signal is higher than that of the useful signal in order that a countermeasure device hooks onto this pseudo signal and ignores the useful signal. The frequency of the pseudo signal differs sufficiently from that of the useful signal to ensure that the jamming signals, retransmitted by the countermeasure device on the pseudo frequency, are rejected in the intermediate frequency amplifier of the radar receiver.

6 Claims, 2 Drawing Figures

PROCESS FOR THE PROTECTION OF A RADAR AGAINST JAMMING AND RADAR FOR PUTTING THIS PROCESS INTO EFFECT

BACKGROUND OF THE INVENTION

The present invention relates to processes for protecting a radar against jamming making it possible to obtain a correct detection, despite intentional spurious transmissions for the purpose of jamming this detection. It also relates to radars, which have been especially adapted to put this process into effect.

It is known to jam a radar by transmitting, preferably on the wavelength used by it, clutter signals which, superimposed on the echoes which it receives, disturb the operation of the receiver and/or analysis equipment for the signals detected by this receiver. The best known process consists of transmitting a high-powered, continuous signal on the frequency of the said radar and this completely saturates the radar receiver.

To escape from this jamming action, radars of the so-called frequency agile type have been developed and it is possible to vary the transmission frequency thereof by selecting this frequency, either manually or automatically, as a function of the environment from a number of preselected frequencies. This device also makes it possible to prevent disturbing another radar forming part of the surveillance system in question.

Improvements to radars and jammers have taken place simultaneously, each alternatively being at an advantage compared with the other. At present, countermeasure systems comprising analyzers for determining the transmission frequency of the radar to be jammed and for controlling the jammer on the basis thereof, are able to acquire the frequency of the radar on the basis of a very small number of pulses and specifically two or three pulses. To overcome this obstacle it is necessary to be able to change the radar transmission frequency from one pulse to the next. This is difficult to obtain, although fundamentally achievable. However, under these conditions, it becomes impossible to carry out Doppler processing on the pulses received, because the frequency must remain fixed during the processing of a plot, which is obtained by the processing of a pulse train.

BRIEF SUMMARY OF THE INVENTION

In order to be able to transmit this fixed frequency pulse train without being detected by the jammer, the invention proposes a process for the protection of a radar against jamming in which a useful signal formed from pulses having a first frequency $f_1$ is transmitted, wherein simultaneously a decoy or pseudo-signal is transmitted having an amplitude which is higher than that of the useful signal and formed by pulses synchronous with those of the useful signal and having a second frequency $f_2$, which is different to $f_1$.

BRIEF DESCRIPTION OF THE DRAWINGS

The invention is described in greater detail hereinafter relative to non-limitative embodiments and the attached drawings, wherein.

DETAILED DESCRIPTION OF THE INVENTION

Figure 1:
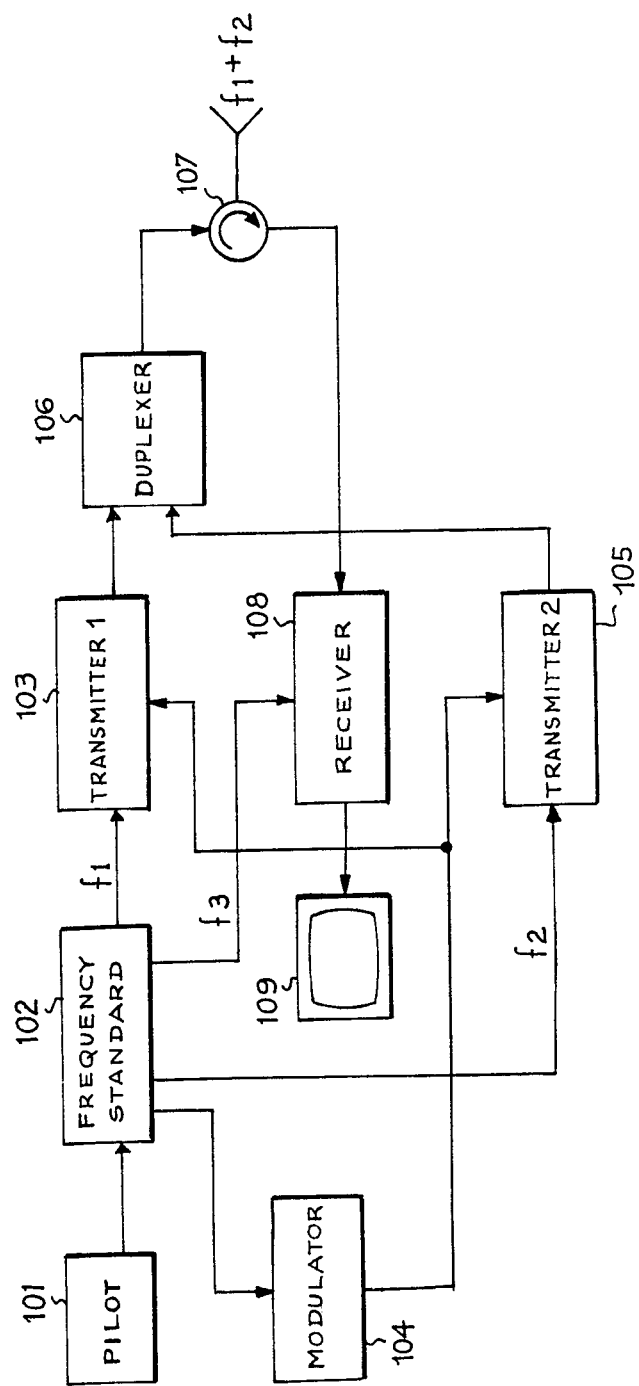
FIG. 1 shows a diagram of a fixed frequency radar.

The analysis receiver of the countermeasure system piloting the jammer must be able to detect the transmission from a radar by scanning a relatively wide frequency band in which there is a large number of varied spurious signals. For this purpose, it analyzes the signals according to criteria corresponding to the most probable characteristics of a radar. As a result, when it has detected such a transmission, it rejects the others, at least within certain limits which determine a blind area around the thus detected transmission. Thus, if this device detects a regular train of constant frequency pulses with a high power level, it cannot detect pulses which are synchronous therewith, having a close frequency and a lower power level.

Thus, according to the invention, a high-powered pseudo radar signal or decoy signal is transmitted, which is detected by the countermeasure system and which analyzes it as being a genuine radar transmission. The countermeasure system is locked on this transmission and triggers the retransmission of its jammer on the same frequency.

The radar comprising the protection system which has transmitted the pseudo radar transmission does not have means for receiving and processing echoes or jamming signals, corresponding to this pseudo transmission. However, it does have a second transmitter and corresponding reception and processing means tuned to a frequency close to that of the pseudo transmission. The transmitter has a lower power level than that of the pseudo signal transmitter. This transmission is not jammed by the countermeasure device, which is blinded by the pseudo transmission. The echoes corresponding to the useful transmission are processed in the radar receiver and give the desired information. Naturally, this receiver must be able to discriminate between the echoes corresponding to the effective transmission and those corresponding to the pseudo transmission. This discrimination is brought about by the frequency shift between them.

Seen from the jammer side, in order that the pseudo transmission cancels out the useful transmission, its power must be well above that of the useful transmission. In practice, there is to be a variation of at least ten decibels between these two transmissions.

However, seen from the radar side, it is necessary to have an adequate frequency shift to be able to discriminate the useful echo from the jamming signal. In practice, a shift at least equal to three time the bandwidth of the intermediate frequency stage of radar receivers is used.

This process, which is applicable in all cases, is obviously usable for frequency-agile radars. In this case, to ensure that the countermeasure system when carrying out a detailed analysis of the signals received, cannot distinguish between the pseudo transmission and the useful transmission, it is of interest to vary the frequency of the pseudo signal with the same timing as the useful frequency by locking in phase the two frequencies together. Thus, if the pseudo frequency remained constant, which is possible, it would be easier for the countermeasure device to eliminate it during its processing and to examine around this fixed frequency the mobile frequency signals liable to constitute the useful transmissions of a radar.

The simplest solution consists of keeping a constant frequency interval, which makes it possible to generate the two frequencies simultaneously from a greatly simplified apparatus.

However, to increase protection, it is useful to independently vary the pseudo and useful frequencies, whilst obviating by means of a very simple exclusion system of the control device, the selection of frequencies which are too close together and liable to lead to a jamming of the useful transmission by the pseudo transmission.

When means are available which make it possible to obtain separate frequency variations, it is then easy to reserve particular range for the pseudo transmission in order to be able to use in the same area a group of frequency-mobile radars, whilst ensuring that the pseudo transmission of one of them does not disturb the measurements of the others. For this purpose, separate bands are reserved for the useful transmission and the pseudo transmission.

In the same case of an area covered by several separate radars, it is merely necessary in fact for one of these radars to be equipped with one of these means permitting the transmission of a pseudo transmission to protect all the other radars.

Once again, in the case of an area covered by several radars, if it is possible to use a device for transmitting data between these radars, it is then possible to render commonplace the transmission band in order to have all these available for both the pseudo transmission and the useful transmissions. Thus, by having a centralized control device located e.g. in a master radar carrying pseudo transmission protection means, it is possible to control the transmission frequencies of the different radars of the area so as to distribute them over the entire range, without at any moment the pseudo transmission disturbing the useful transmission of the radar terminals and without there being any mutual jamming between the useful transmission.

An improvement to this process consists of providing the possibility of progressively reducing the frequency variation between the pseudo transmission and the useful transmission. This is very easy when using digitally controlled frequency synthesizers.

Under these conditions, when the variation becomes sufficiently small, the radar receiver starts to detect the transmission from the jammer. This detection takes place by using the characteristics of the jamming transmission in accordance with two means optionally used simultaneously.

Firstly, by means of a threshold device, it is possible to find out the appearance, concomitant with the bringing together of the frequencies, of an echo which start to preponderate over the others. Thus, the signal received from a jammer is much greater than a passive echo. The threshold circuit then makes it possible to give the necessary information regarding the presence of the jammer.

As most jammers transmit in a continuous manner, it is also possible to detect the appearance of a continuous echo, which is consequently quite separate from the echoes due to the reflection of the useful signal formed by pulses.

It is obvious that in most cases information will only be available on the bearing of the jammer, without any information on the distance. However, this information is still useful because, by concentrating the radar detection means and if necessary only the analysis means so as not to allert the countermeasure device, whilst keeping the transmission permanently pointed on it, it is possible to more accurately locate the echo received in response to the useful signal. It would even be possible to have an echo appear, which had hitherto disappeared in the analysis because it was too weak compared with the other echoes obtained in a wider observation sector.

It is also pointed out that, in the case of the surveillance of an area having several radars, the simple indication of the bearing by at least two of these radars provides the distance information by triangulation.

The radar whose diagram is shown in FIG. 1 and which makes it possible to put into effect the process according to the invention, comprises a pilot stage 101 supplying a very stable pure frequency, which makes it possible to pilot a frequency standard 102 supplying, e.g. by synthesis, all the signals necesary for the radar.

A first signal of frequency $f_1$, corresponding to the useful transmission of the radar, is applied to a power transmitter 103, which also receives a modulation signal formed by pulses from a modulator 104, which is itself piloted by another output frequency from standard 102.

Standard 102 also generates a frequency f2 corresponding to the pseudo signal, which is applied to a second power transmitter 105, which receives the same modulation signal as the first transmitter 103. The output power of this second transmitter exceeds that of the first in a ratio of approximately 10 decibels.

The two signals which are consequently available are applied to a duplexer 106 making it possible to decouple the outputs of the transmitters. This duplexer supplies the sum of the two signals to a circulator 107, which supplies a transmission-reception antenna. The signals received by this antenna, consisting on the one hand of those corresponding to the echoes and on the other of those corresponding to the jammers tuned to f2, are applied to the circulator 107, which forwards them to a receiver 108. Receiver 108 receives from frequency standard 102, a signal of frequency f3 making it possible to heterodyne the signals received. The latter are then amplified in an intermediate frequency amplifier provided with a relatively narrow filter centered on f1–f3.

The signals corresponding to the echoes due to the useful signal supplied by the first transmitter 103 are then amplifed and detected and make it possible to supply a processing device 109 having in particular display means symbolized in the drawing by a cathode ray tube.

The signals coming from a possible jammer tuned to frequency f2 are transposed in the receiver to a frequency f2–f3, whose value is approximately three times higher than the bandwidth of the intermediate frequency amplifier of this receiver. The shape of this bandwidth is such that the edges are sufficiently steep to prevent any detection of the signals due to the jammer. According to the technological possibilities making it possible to produce the filters of the intermediate frequency amplifier, the variation between f1 and f2 is chosen so as to obtain the desired rejection, whilst taking account of f3.

Figure 2:
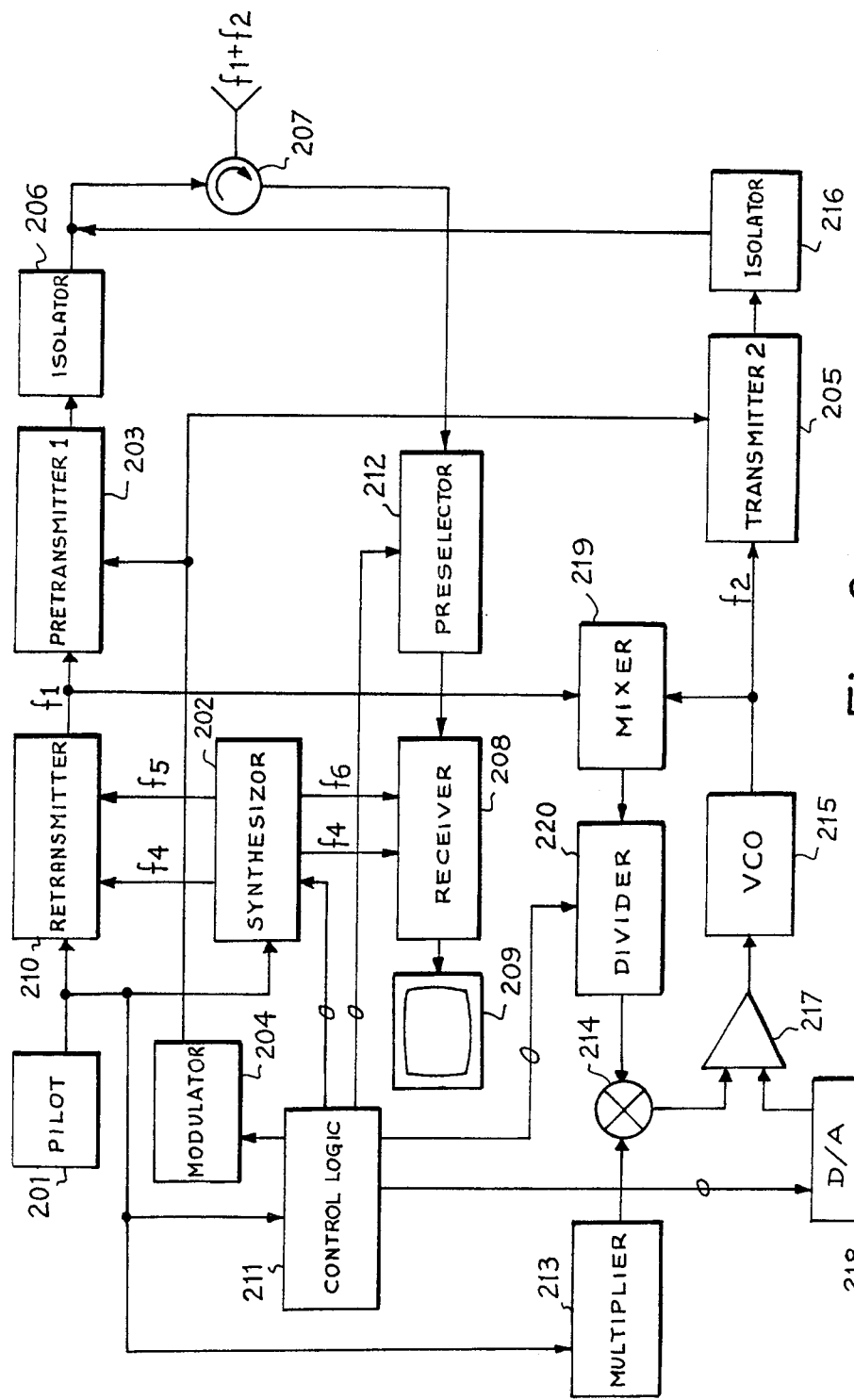
FIG. 2 shows a diagram of a frequency-agile radar.

In the case of a frequency-agile radar, e.g. of the Doppler type, whose diagram is shown in FIG. 2, a pilot oscillator 201 supplies a very pure and very stable frequency making it possible to obtain a phase coherence in all the circuits of the radar. The signal supplied by this pilot is firstly applied to a frequency-agile synthesizer 202 making it possible to supply two frequencies f4 and f5. The latter are supplied to a pretransmitter 210, which also receives the pilot signal. This pretransmitter contains circuits, which by a double frequency change of the pilot signal by means of signals f4 and f5, make it possible to obtain a signal at the useful frequency f1, but at a lower level.

The frequency-agile synthesizer 202 receives by a parallel connection, control signals from a control logic 211 enabling it to change the frequency f5 and consequently f1 in accordance with a preferably random sequence within a predetermined frequency plan.

The signal supplied by pretransmitter 210 is applied to a first transmitter 203, which amplifies it to a suitable level for transmission. Transmitter 203 is pulse-modulated by a modulator 204, which itself receives synchronization signals from control logic 211. The useful signal at the output of the first transmitter is applied to an isolator 206 and then to a circulator 207, which supplies a transmission-reception antenna.

The signals received by the antenna and coming both from the targets and from jammers, are applied to circulator 207, which forwards them to a preselector 212. The latter is a filter having YIG elements, which can be tuned to the useful frquency f1 by control signals arriving on a parallel connection from control logic 211. This in itself makes it possible to considerably attenuate the signals from the jammers which are considerably stronger than the echoes, because they come from an active transmitter positioned at the location of the targets which behave like a passive transmitter for the useful signal.

The signal at the output of this preselector is applied to a receiver 208 receiving signals f4 and f6 from synthesizer 202 and making it possible to bring about a double frequency change by heterodyning. This receiver comprises a final intermediate frequency amplifier centered on the frequency of the useful signal following this double heterodyning, whereby f6 obviously varies as a function of the variations of f5 controlled by logic 211 in such a way that the intermediate frequency remains constant.

Thus, the useful signals are the only ones to be detected by the receiver, because the signals corresponding to the pseudo transmission have been rejected by the filter of the intermediate frequency amplifier. The thus detected useful signals are applied to processing means 209.

The signal from the pretransmitter undergoes a frequency change in a circuit, to be described hereinafter, in order to obtain a signal at frequency f2 corresponding to the pseudo signal, but having a lower power level. This signal is amplified in a second power transmitter 205 modulated by the same signal as the one which modulates the first transmitter. The thus obtained pseudo signal is transmitted to the antenna via an isolator 216 and circulator 207.

To obtain the signal at frequency f2, a simplified synthesizer is used, which operates on the basis of a reference signal supplied by multiplier 213, which receives the pilot signal to maintain the phase standard.

This reference signal is applied to a phase comparator 214, which supplies an error signal, which pilots a voltage controlled oscillator VCO 215 via an amplifier 217. This amplifier 217 also receives a prepositioning voltage supplied by a digital-analog converter 218, which receives a parallel control signal from control logic 211. This prepositioning signal makes it possible to directly obtain at each transmission frequency change controlled by logic 211, an approximate value of the pseudo signal frequency, which is then made more accurate by the phase loop of the device. Thus, oscillator 215 supplies a signal at frequency f2, but which has a lower level. This signal is applied on the one hand to transmitter 205 and on the other to a mixer 219, which also receives a signal from the pretransmitter 210.

The signal coming from this mixture of f1 and f2 is applied to a variable ratio divider 220, which receives a control signal on a parallel connection from logic 211. The control signal is such that it programs divider 220 so as to obtain the reference frequency supplied by multiplier 213 on the basis of the desired frequency f2. The signal obtained in this way by division is applied to comparator 214, which supplies the error signal resulting from comparison with the reference signal.

Thus, this device makes it possible to select the frequency of the pseudo signal in such a way that it is equal to the frequency of the useful signal, plus or minus an integral number of times the reference frequency supplied by pilot 201.

Thus, such a transmitter makes it possible to transmit a fixed frequency pulse train enabling the obtention of a Doppler measurement and to then change this frequency to prevent position fixing. A pseudo frequency is simultaneously transmitted at a higher level to complete the protection against jammers. The shift and variation of these useful and pseudo frequencies are decoupled from one another, which further increases the protection.

What is claimed is:

1. A process for the protection of a radar having a transmitter and receiver against jamming comprising the steps of transmitting a useful signal formed from pulses having a first frequency f1, simultaneously transmitting therewith a pseudo signal formed from pulses synchronous with those of the useful signal and having a second frequency f2, close to and differing from f1, and an amplitude higher than that of the useful signal, wherein said transmitted signals have a shift between said frequencies f1 and f2 greater than three times the band width of an intermediate frequency amplifier of the radar receiver, and wherein the amplitude of the pseudo signal is more than approximately 10 decibels higher than the amplitude of the useful signal.

2. A process according to claim 1, comprising transmitting the first and pseudo signals with a shift between the respective frequencies $f_1$ and $f_2$ of said signals so that said radar rejects a jamming signal at frequency $f_2$ received by said radar.

3. A process according to claim 2, comprising making the amplitude of the pseudo signal sufficiently large to hook the receiver of a countermeasure device by making it ignore the useful signal.

4. A process according to claim 1, comprising chosing said amplitudes and frequencies to provide phase-hooking of the useful and pseudo signals.

5. A radar comprising means for generating a first signal at frequency f1, a second frequency at f2 which is shifted from f1 by an amount greater than three times the bandwidth of the intermediate frequency of the radar receiver, and a third local oscillator signal at frequency f3, a modulator for generating modulation signals, a first transmitter for amplifiying the first signal and for modulating it under the control of the modulator, a second transmitter for amplifying the second signal to an amplitude approximately 10 db above the first signal and for modulating it under the control of the modulator, a duplexer for collecting together the signals amplified by the two transmitters, a circulator connected to an antenna for transmitting the amplified signals and receiving echoes at frequency f1 and jamming signals at f2, a receiver for receiving the reception signals from the circulator, heterodyning them with the third signal at frequency f3, amplifying and detecting the signals corresponding to the echoes and rejecting the signals corresponding to the jammers, and analysis and display means for processing the signals detected by the receiver.

6. A radar according to claim 8, wherein the generating means for the first second and third signals are of the frequency mobile type comprising a frequency-agile frequency synthesizer, connected to a logic circuit and to means for varying the frequency of said first signal f1.

* * * * *